UNITED STATES PATENT OFFICE.

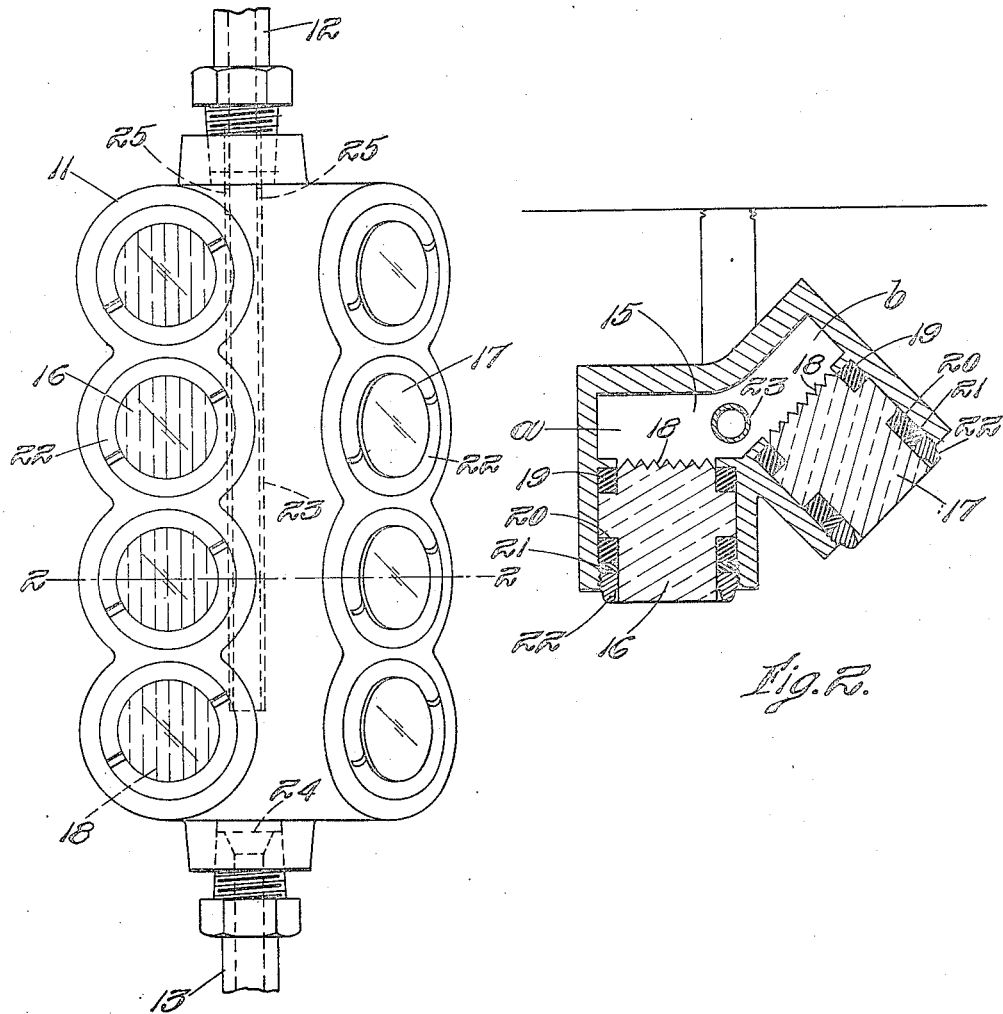

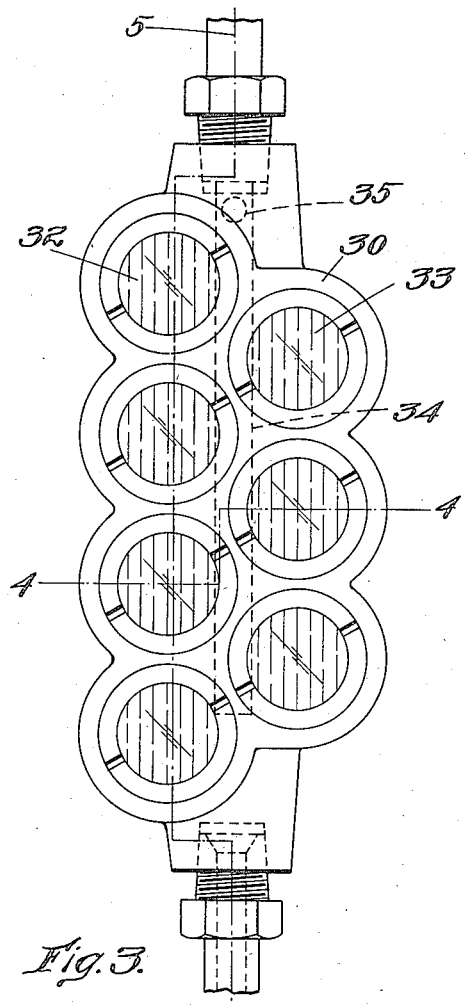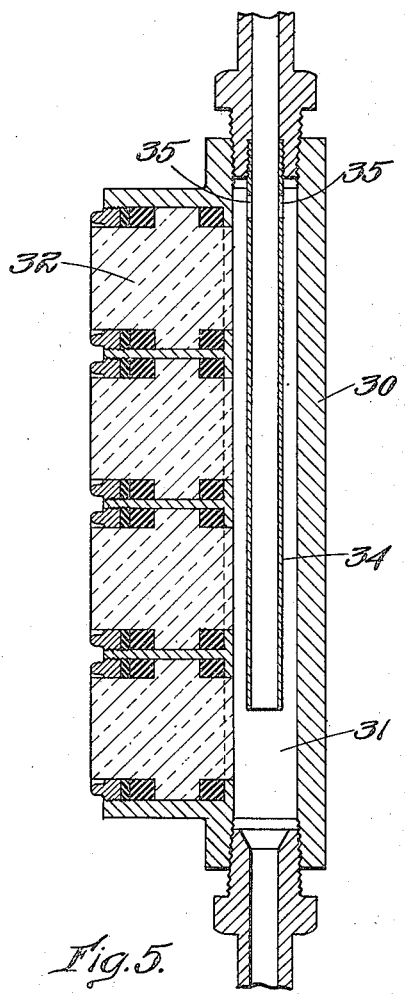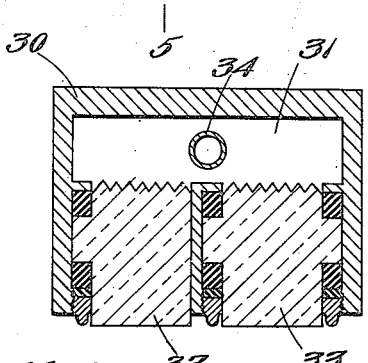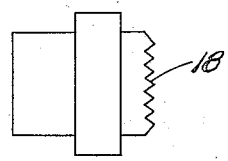

WILLIAM J. HANLON, OF FITCHBURG, AND JOHN H. HANLON, OF SOMERVILLE, MASSACHUSETTS.

GAGE-GLASS.

1,139,518.        Specification of Letters Patent.        Patented May 18, 1915.

Application filed July 2, 1914. Serial No. 848,691.

*To all whom it may concern:*

Be it known that we, WILLIAM J. HANLON and JOHN H. HANLON, citizens of the United States, residing at Fitchburg, county of Worcester, Massachusetts, and Somerville, county of Middlesex, State of Massachusetts, have invented a certain new and useful Improvement in Gage-Glasses, of which the following is a specification, reference being had therein to the accompanying drawings.

Our invention has for its object a new and improved gage glass of the bulls-eye type capable of use on locomotives and the like.

A particular object of the invention is to provide a gage glass which may be kept clean without removing the bulls-eyes from the body and which may be placed with its back to the boiler and yet be readily visible particularly to the fireman when he is standing in the position occupied when shoveling coal and at the same time to the engineer on his seat.

In the gage glass embodying our invention the bulls eyes are effectually protected so that the gage may be cleaned by being blown out without injuring or burning away the glasses.

Our invention will be fully understood from the following description when taken in connection with the accompanying drawings and the novel features thereof will be pointed out and clearly defined in the claims at the close of the specification.

Referring to the drawings,—Figure 1 is an elevation of a gage glass embodying our invention in its preferred form. Fig. 2 is a section on line 2—2 of Fig. 1. Fig. 3 is an elevation of a gage glass embodying our invention in modified form. Fig. 4 is a section on line 4—4 of Fig. 3. Fig. 5 is a section on line 5—5 of Fig. 3. Fig. 6 is a view showing one of the glass bulls-eyes removed from the gage.

Referring now to the drawings, and particularly to Figs. 1, 2, and 6, at 11 is shown the body and at 12 and 13 respectively are shown the top and bottom mountings. Said body 11 is hollow and contains a water space 15 of an angular cross section as will be seen from Fig. 2. The portion of the water space designated $a$ in Fig. 2, is parallel to the adjacent wall of the boiler while the portion of the water space designated $b$ is at an angle thereto sufficient to enable the engineer who sits on the right hand side of the locomotive to see easily the level of water in the gage. The gage is provided with two rows of bulls-eyes arranged vertically. One row of bulls-eyes 16 is opposite the portion of the water space $a$ while the other row of bulls-eyes 17 is opposite the portion of the water space designated $b$ and there is therefore an opaque surface opposite each bulls-eye. The bulls-eyes are each of the construction shown in Fig. 6 being made of suitable glass to withstand the action of steam under working pressures. Each bulls-eye has upon its rear face a series of ribs or prisms 18 arranged vertically. The bulls-eyes are held in place between suitable gaskets 19, 20 and 21 and a screw threaded collar 22.

At 23 is shown a downwardly depending blow-out tube extending to a point a short distance above the bottom orifice 24. This tube ends at a point a short distance above the bottom orifice and this distance is just sufficient so that when the gage glass is being blown out there will result a swirling action in a substantially circular path on each side of the water space near the bottom of the glass. We have found by careful study and experimentation that the best results are obtained by having the distance between the bottom orifice and the end of the blow out pipe 23 from three-fourths of an inch to an inch and a half. When thus arranged there is a strong swirling action which effectually cleans all the mud out of the bottom of the water space and from the lower bulls-eyes. At 25, are shown two small ports to prevent the water space filling with water after the gage is blown out.

The gage glass just described is exceedingly simple and effective. The row of bulls-eyes numbered 16 is plainly seen by the fireman when he is shoveling coal from the tender to the furnace; the other row of bulls-eyes is so located that it is easily seen by the engineer from his seat on the right hand side of the locomotive. We have found in practice that by providing the inner surface of the bulls-eyes with vertical ribs or prisms as described, the bulls-eyes which are covered by water appear black while the bulls-eyes which are covered by steam are white and that there is a sharp contrast between the bulls-eyes above the water line and those below it. Therefore it is not necessary for the engineer or fireman to look closely at the gage glass to ascertain the exact level of the water for so long as the lowest bulls-eye shows black there is sufficient water in the boiler for safe operation. This arrangement is of very great advantage because it enables the engineer or fireman to know at a glance what is the level of the water, and the white bulls-eyes become a sort of danger signal.

Referring now to Figs. 3, 4 and 5 there is shown in these figures another type of bulls-eye gage embodying our invention. In this type, the body 30 incloses a single water space 31 having on the front thereof two staggered rows of bulls-eyes 32 and 33 respectively. These bulls-eyes are constructed as shown in Fig. 6 as previously described with vertical ribs or prisms on the back surface. At 34 is shown the blow out tube extending downwardly centrally of the water space to a point a short distance above the orifice of the lower mounting. The ports 35 near the upper end of the blow off tube prevent the upper part of the space within the body of the gage glass filling with water after the gage has been blown out.

It will be seen that this gage glass is constructed so that it may be placed with its back against the boiler and, therefore, does not require to be lighted on the sides; also that the lower glasses may be effectually cleaned by the swirling action of water and that the bulls-eyes below the water line will show black while those above the water line will show white so that it is not necessary for the fireman and engineer to give close attention to ascertain the exact height of the water in the boiler.

What we claim is:

1. The improved gage glass comprising a body having an opaque back inclosing a water space, a series of bulls-eyes having vertically arranged prismatic ribs on their rear surface, and a blow off tube extending from the top mounting to a point somewhat above the lower orifice in the bottom mounting.

2. The said improved gage glass comprising a body having an opaque back, said body inclosing a water space in two portions, one at an angle to the other, two rows of bulls-eyes one row being opposite one portion of the water space and the other row being opposite the other portion of the water space, said bulls-eyes being provided on their rear surface with vertically arranged ribs.

3. The improved gage glass comprising a body having an opaque back, said body inclosing a water space in two portions, one at an angle to the other, two rows of bulls-eyes, one row being opposite one portion of the water space and the other row being opposite the other portion of the water space, said bulls-eyes being provided on their rear surfaces with vertically arranged ribs, and a blow off tube extending from the top of the water space to a point a short distance above the bottom of the water space.

In testimony whereof we affix our signatures, in presence of two witnesses.

WILLIAM J. HANLON.
JOHN H. HANLON.

Witnesses for William J. Hanlon:
  GEORGE P. DIKE,
  ALICE H. MORRISON.
Witnesses for John H. Hanlon:
  JOHN H. PARKER,
  ALICE H. MORRISON.